April 26, 1955

J. H. HICKEY

MEANS FOR AUTOMATICALLY CODING AND DECODING A MAGNETIC TAPE 2,707,212

Filed May 25, 1950

2 Sheets-Sheet 1

INVENTOR.
JOHN H. HICKEY

BY

Roderick B. Jones
ATTORNEYS

April 26, 1955

J. H. HICKEY

MEANS FOR AUTOMATICALLY CODING AND DECODING A MAGNETIC TAPE 2,707,212

Filed May 25, 1950

2 Sheets-Sheet 2

INVENTOR.
JOHN H. HICKEY

BY

Roderick B. Jones

ATTORNEYS

United States Patent Office 2,707,212

Patented Apr. 26, 1955

2,707,212

MEANS FOR AUTOMATICALLY CODING AND DECODING A MAGNETIC TAPE

John H. Hickey, Port Washington, N. Y.

Application May 25, 1950, Serial No. 164,121

16 Claims. (Cl. 179—100.2)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in sound recording and reproducing devices, and more particularly pertains to coded, mechanical-tape sound-recording and reproducing instruments.

In the recording and reproduction of sound by means of a magnetic tape, coding for security purposes has been achieved in the past by taking advantage of the very critical nature of the relation between the angle of disposition of the recording gap and the angle of disposition of the pick-up gap. That is, in order for intelligence to be reproduced, the pick-up gap must be in the same angular position as the recording gap was at the time of recording. In the absence of such positional alignment, the reproduction appears simply as noise. Accordingly, a single record-reproduce head having a gap at a predetermined angle would serve to conceal the intelligence on the tape until reproduction was attempted with the head at the same angle. Similarly, by employing a plurality of heads having gaps at different predetermined angles, and by using the numerous heads in predetermined sequence, the intelligence could be reproduced. In such manner, the code could be changed by changing the sequence and/or duration of operation of the many heads.

The principal disadvantages of such devices of the prior art are their complexity and relatively high cost of manufacture, and the relative ease with which such a code can be broken.

The principal object of this invention is to provide a coded, mechanical-tape sound-recording and reproducing device providing a novel system for maintaining the security of recorded intelligence.

Another object is to provide a device of the character described having a structure of greater flexibility, facility in use and simplicity than devices of like general nature heretofore employed.

A further object is to provide a novel record-reproduce head in a device of the character described.

Still another object is to provide novel mechanical structure and a novel electrical system in a device of the character described for the purposes herein set forth.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 3:
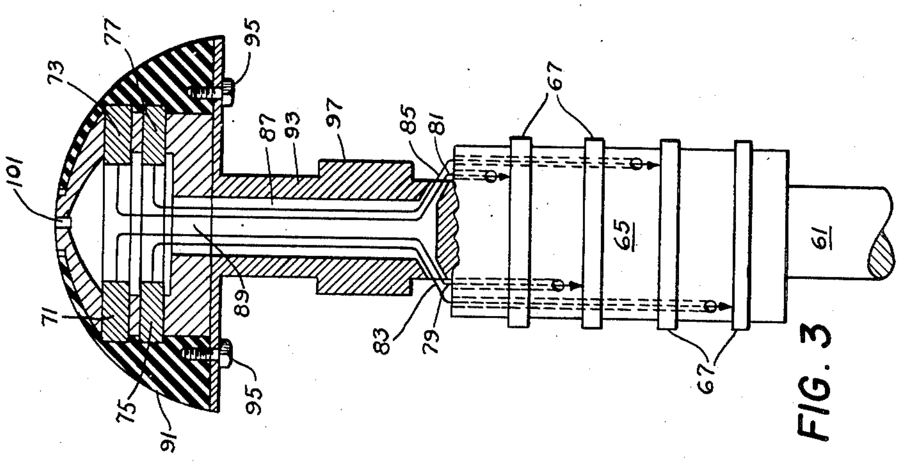
Fig. 3 is a plan view of the head element thereof, shown on an enlarged scale.
Figure 1:
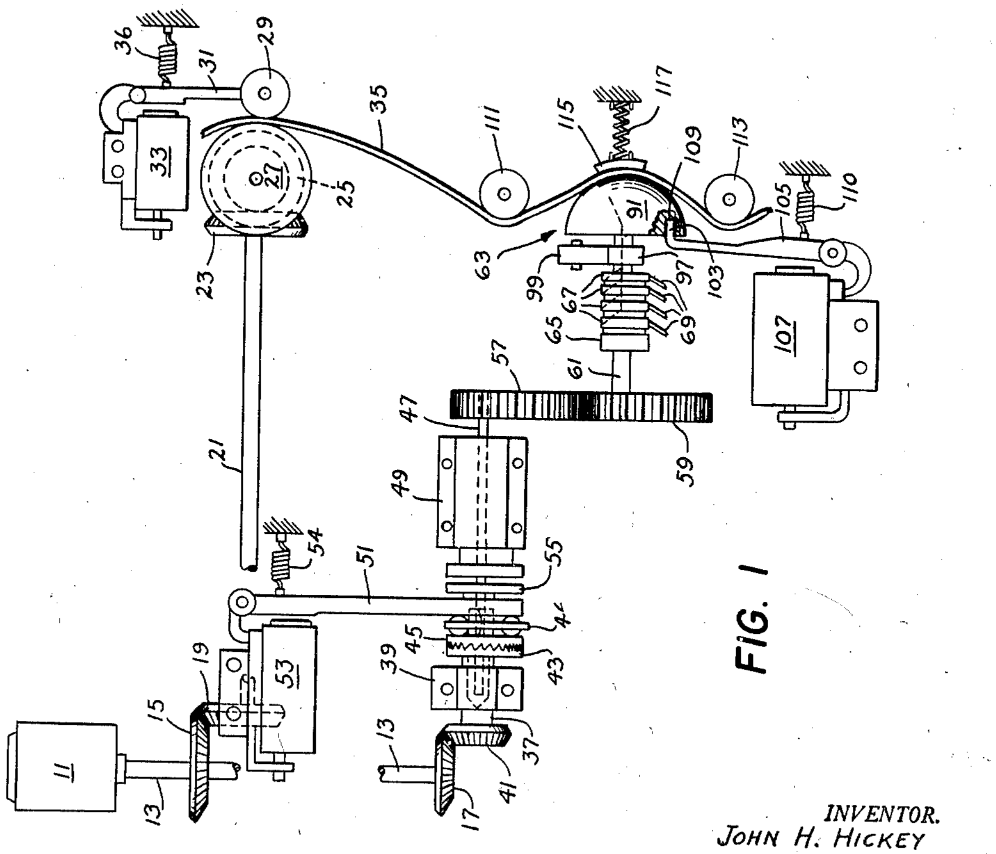
Fig. 1 is a plan view of the mechanical structure of the subject device, showing a preferred embodiment of the invention.

Generally, the subject device employs a rotating or oscillating record-reproduce head, thereby providing a rotating or oscillating recording gap to impress the intelligence on the tape, together with means to duplicate the movements of such head with respect to distance and time interval in order to reproduce the intelligence so impressed. That is, since the recording head rotates or oscillates, the reproduce head rotates or oscillates in exactly the same fashion and in the same time relationship with each section of tape as the recording head did. To produce and maintain this condition, movement of the head is initiated by a control tone, and to keep the time relationship of head and tape correct they are coupled mechanically and driven either by the same motor or by different motors at a predetermined speed.

To change the code, either the speed or motion of the recording head is changed. Alternatively, the code can be changed by changing both the speed and the motion of the recording head.

Various linkages can be employed to provide a variety of variable motions. Oscillating motion can be provided by an eccentric coupling, elliptic gearing will produce a constantly variable speed rotating head, and cams, logarithmic spirals or other linkages will produce other motions.

Since there is no recording possible when the gap of the recording head is parallel to the direction of movement of the tape, which condition obtains twice in each revolution of the head, it is desirable to use a logarithmic spiral type of linkage to pass over the null area quickly. As the gap approaches such parallelism, the volume of recording also decreases, so that an oscillating head limited in movement to 45° from normalcy to the direction of tape movement is also productive of satisfactory performance.

A preferred embodiment of the invention illustrated in the drawings utilizes elliptic or eccentric gearing to accomplish the objects hereinabove set forth.

Constant-speed motor 11 drives shaft 13, which carries bevel gears 15 and 17. Bevel gear 19, carried on shaft 21, is driven by bevel gear 15. Said shaft 21 also carries bevel gear 23, which drives bevel gear 25, on which is secured the capstan 27.

Idler wheel 29 is carried rotatably on the end of the arm 31 of relay 33. Said idler wheel pushes the magnetic tape 35 against the capstan 27 when said relay 33 is energized and overcomes the retarding force of tension spring 36, the tape then being driven at a constant speed.

Shaft 37 is mounted rotatably in bearing 39 and carries bevel gear 41, which is driven by bevel gear 17. Said shaft 37 also carries sawtooth wheel 43. Sawtooth wheel 45 is pinned to shaft 47, which rotates in bearing 49, and said wheel 45 is adapted to mesh with sawtooth wheel 43. Arm 51 of relay 53 is carried at its end on said shaft 47 in such manner that, when relay 53 is energized and overcomes the retarding force of tension spring 54, said arm 51 pushes sawtooth wheel 45, through bearing 46, into mesh with sawtooth wheel 43. A friction stop 55 carried on shaft 47 is adapted to abut bearing 49 to brake rotation of said shaft when relay 53 is de-energized.

Gear 57 is carried eccentrically on shaft 47. Gear 59 is carried eccentrically on spindle 61 and is driven by gear 57.

The electromagnetic transducer or the record-reproduce head 63 comprises a cylindrical member 65 carrying a plurality of slip rings 67, said member 65 being carried on spindle 61. The slip rings 67 are arranged in spaced relation to contact brushes 69, the circuits being completed to record coils 71 and 73 and to reproduce coils 75 and 77 through conductors 79, 81, 83 and 85, as shown in Fig. 3. Said conductors pass from the member 65 into the non-magnetic spindle extension 87 and then through the laminated core 89 of the record-reproduce dome 91 to their respective coils. Said dome is substantially a surface of revolution with respect to its axis. A collar 93 carried on extension 87 is provided with a disc face upon which dome 91 is secured by bolts 95, and is further provided with an enlarged portion 97 adapted to be rotated by manual position wheel 99. The dome 91 is also provided with a suitable spacer 101.

The pin 103 on the end of arm 105 of relay 107 is held in the bore 109 in the rear face of dome 91 by tension spring 110, and thus locks said dome against rotation. Idler pulleys 111 and 113, and felt pad 115, are also provided to assist in keeping the tape 35 positioned correctly in passing over dome 91, said pad 115 being held against said tape by compression spring 117.

Figure 2:
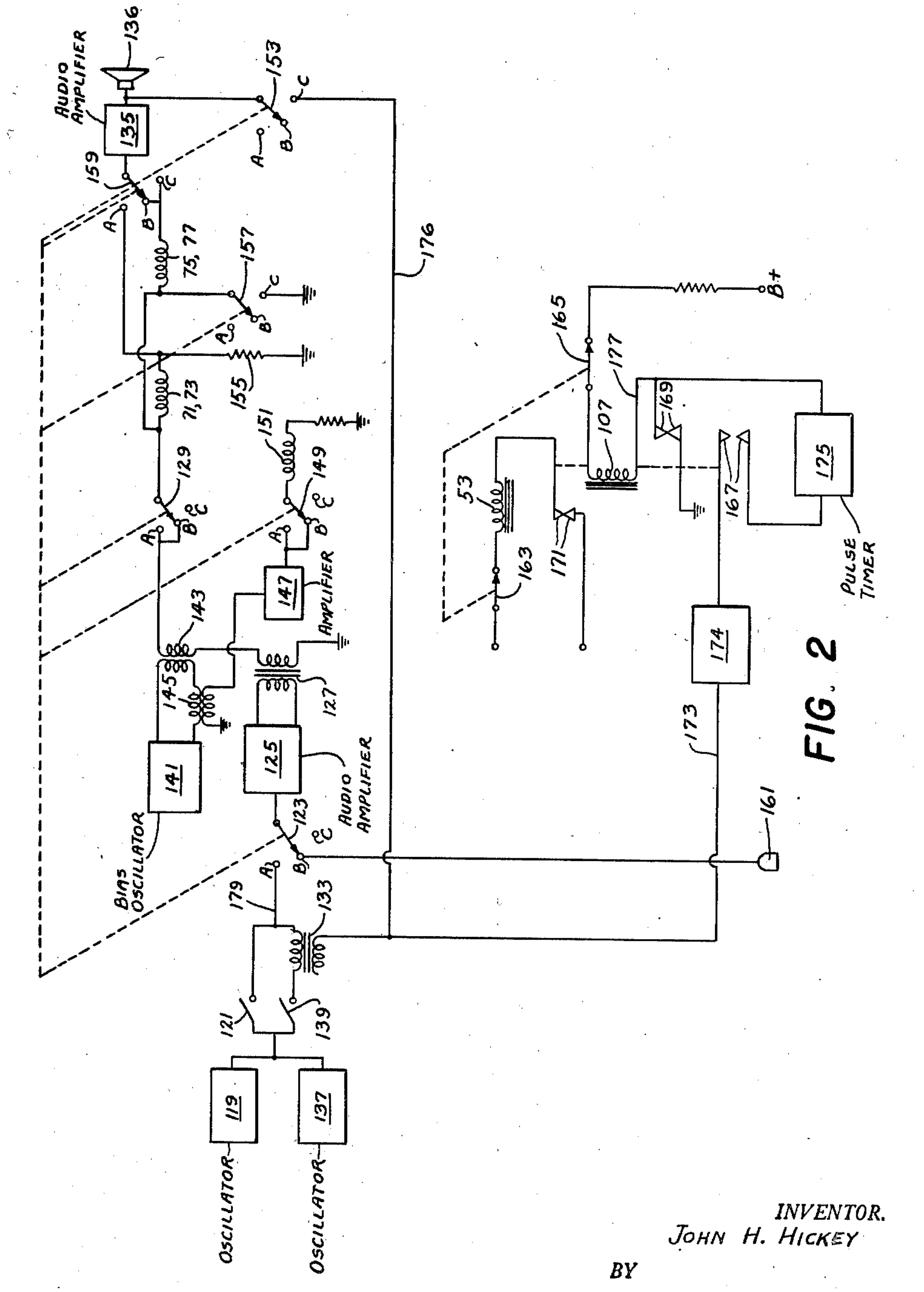
Fig. 2 is a circuit diagram thereof.

The principal components of the electrical circuits of the subject device are shown in Fig. 2. A first oscillator 119 is keyed by switch 121, and the audio signal therefrom is fed successively through switch 123, audio amplifier 125, transformer coupling 127, switch 129 and record coils 71, 73 where the field built up is impressed upon the tape 35. Simultaneously, the signal from oscillator 119 is fed through transformer coupling 133 directly to the audio amplifier 135 and speaker 136.

A second oscillator 137 is keyed by switch 139. The signal from oscillator 137 is fed through the primary winding of transformer 133 to the switch 123 and then to record coils 71, 73 and to the audio amplifier 135 and speaker 136 in the same manner as that of the signal from oscillator 119.

Bias oscillator 141 is coupled by transformer 143 at the output of the secondary winding of transformer 127 and is also coupled by transformer 145 successively to amplifier 147 and then through switch 149 to erase coil 151.

Record coils 71, 73 are provided with a path to ground through a suitable resistance 155, and switch 157 provides a path to ground from playback coils 75, 77. The audio amplifier 135 is also coupled to playback coils 75, 77 by switch 159 and a microphone 161 is coupled to audio amplifier 125 by switch 123.

The switches 123, 149, 129, 157, 153 and 159 are each provided with a "control" terminal A, a "record" terminal B and a "playback" terminal C and are ganged to permit the making and breaking of circuits in the manner hereinafter described.

Relay 53 is energized by a suitable source upon closing of switch 163. Locking relay 107 is energized by a suitable source upon closing of switch 165. Said switches 163 and 165 are ganged. Contacts 167 of relay 107 are closed normally, and contacts 169 and 171 of said relay 107 are open normally. Said contacts 167 are in the conductor 173 that couples the secondary of transformer 133 to the input of a pulse timer 175, the output of said pulse timer 175 having, alternately, a path to ground through contacts 169 and a path to relay 107 through conductor 177. Filter 174 in conductor 173 permits activation of the pulse timer 175 by one of the oscillators only, in the manner hereinafter described.

*Operation*

The first step in operation of the device is the impression of a code control signal upon the tape 35 to designate the particular mechanical linkage employed to couple shaft 47 to spindle 61. This is accomplished as follows: Switches 163 and 165 are opened, thereby de-energizing relays 53 and 107 and consequently opening contacts 171 and 169, and closing contacts 167. The head 63 is then rotated to starting position by means of manual position wheel 99, such rotation permitting pin 103 to fall into bore 109 responsive to the force of spring 110 on the arm of relay 107. Switches 123, 149, 129, 157, 153 and 159 are then set on control position A, thereby making the circuit between audio amplifier 125 and conductor 179, making the circuit between amplifier 147 and erase coil 151, making the circuit between the secondary of transformer 127 and record coils 71, 73, breaking the circuit between playback coils 75, 77 and audio amplifier 135, and breaking the circuit to ground before said playback coils. Relay 33 is then energized by a suitable source of power to cause idler wheel 39 to press against tape 35 and commence feeding said tape, motor 11 having been actuated to rotate capstan 27.

Switch 121 is then closed the number of times necessary to impress upon the tape the intelligence denoting the particular drive system employed, the oscillator 119 providing a suitable signal, such as 300 cycles, thereon through the record coils 71, 73. That signal is blocked from pulse timer 175 by filter 174.

A control tone, of the order of 1100 cycles, is then fed to the tape 35 by closing switch 139. The closing of switch 139 also feeds that control tone through the filter 174 to the input of pulse timer 175 through conductor 173 and the presently closed contacts 167 of relay 107, since said contacts 167 are closed when relay 107 is not energized.

When the control tone switch 139 is opened, a positive pulse is transmitted by pulse timer 175. This positive pulse energizes relay 107 and thus closes contacts 171 and 169, and opens contact 167. Contacts 171 being then closed, relay 53 is thereby energized, while the closing of contact 169 permits current to flow through relay 107 to ground after the pulse timer has ceased to transmit, thus locking relay 107 in the energized condition.

When relays 53 and 107 have been energized, the head 63 starts to rotate. The switches 123, 149, 129, 157, 153 and 159 are now turned to "record" position B, thus linking microphone 161 to audio amplifier 125 so that voice frequencies can be impressed on the tape 35.

When the recording has been completed, relay 33 is de-energized, and switches 163 and 165 opened, thus stopping movement of the tape 35 and of the head 63.

In order to play a tape back on the device, the tape having first been rewound, the switches 123, 149, 129, 157, 153 and 159 are turned to "playback" position C, switches 163 and 165 opened and the head 63 fixed in the starting position by means of manual position wheel 99, such starting position being reached when pin 103 drops into bore 109. The tape drive switch (not shown) that energizes relay 33 is then closed and the key-time signal, heretofore impressed on the tape from oscillator 119, can be heard. The number of pulses heard designating the code for a particular drive system between shaft 47 and spindle 61, such drive system is then installed, having first de-energized relay 33 and thus stopped movement of the tape. When the correct drive system has been inserted, and relay 33 energized to drive the tape, the 1100 cycle tone is heard, playback being effected through feedback line 176 that couples amplifier 135 and conductor 173. Such feedback is permitted by switch 153 during playback only. The termination of the 1100 cycle tone creates a positive pulse output from pulse timer 175, causing the head 63 to commence rotating as in the recording operation. Thus the synchronization of the movement of the head and the tape for recording and playback is realized, the head starting to move at the exact instant it did when the recording was made, and since the head and tape drive are integral, the head continues to be oriented correctly.

It is to be noted that, after locking relay 107 has been energized by the positive pulse delivered upon termination of the 1100 cycle tone, contacts 167 are open so that a further signal is not fed into the pulse timer 175.

The 300 cycle tone from oscillator 119 and the 1100 cycle tone from oscillator 137 are each amplified by audio amplifier 125 and mixed with the bias signal from bias oscillator 141. Microphone 161 also feeds through the amplifier 125 and is mixed with the bias signal from oscillator 141. Said bias signal also serves to energize erase coil 151 through amplifier 147 when the device is recording. The signal to be recorded, mixed with the bias signal, is fed to record coils 71, 73 of the head 63. On playback, the signal is picked up by playback coils 75, 77 of the head 63 and is amplified by the audio amplifier 135.

The frequencies above specified are illustrative only. Obviously, many modifications and variations of the present invention are possible in the light of the above teachings. It is therefore to be understood that within the scope of the appended claims the invention may be practiced otherwise than as specifically described.

I claim:

1. A sound recording and reproducing device comprising an electromagnetic transducer having a ring type head with an approximately hemispherical record contacting surface, means to rotate said head on an axis normal to the plane face thereof, a tape-translating mechanism and means coupled to said mechanism in predetermined speed relationship for altering the orientation of said transducer about said axis with respect to such tape according to a predetermined program of angular positions of the transducer with respect to successive segments of tape engaged thereby.

2. A sound recording and reproducing device comprising a ring type approximately hemispherical record-playback head, a tape, means to feed said tape over said head, means to rotate said head on an axis normal to the plane face thereof, means to impress intelligence on said tape during said feed and rotation, and means to play back such intelligence.

3. A sound recording and reproducing device comprising a ring type approximately hemispherical record-playback head, a tape, means to feed said tape over said head, means to rotate said head at a predetermined rate and in predetermined senses on an axis normal to the plane face thereof, means to impress intelligence on said tape during said feed and rotation, and means to play back such intelligence.

4. A sound recording and reproducing device comprising a ring type approximately hemispherical record-playback head, a tape, means to feed said tape over said head at a predetermined rate, means to rotate said head at a predetermined rate and in predetermined senses on an axis normal to the plane face thereof, means to impress intelligence on said tape during said feed and rotation, and means to reproduce said feed and rotation and to play back such intelligence.

5. A sound recording and reproducing device comprising a ring type approximately hemispherical record-playback head, a tape, means to feed said tape over said head at a predetermined rate, means to rotate said head at a predetermined rate and in predetermined senses on an axis normal to the plane face thereof to impress intelligence on said tape during said feed and rotation, and means actuated by a signal impressed on said tape during such recording to reproduce said feed and rotation and to play back such intelligence.

6. A sound recording and reproducing device comprising a ring type approximately hemispherical record-playback head, means in said head to orient and record a signal on a tape and to pick up such signal, a tape, means to feed said tape over said head at a predetermined rate, means to rotate said head at a predetermined rate and in predetermined sequential senses on an axis normal to the plane face thereof means to impress intelligence on said tape during said feed and rotation, means actuated by said signal to reproduce said feed and rotation of recording in the same time relation, and means to reproduce audibly the playback of such intelligence.

7. A sound recording and reproducing device comprising a domed record-playback head, means in said head to orient and record a signal on a tape and to pick up such signal, a tape, means to feed said tape over the dome of said head at a predetermined rate, means to rotate said head in a predetermined pattern of rates and in predetermined sequential senses on an axis normal to the path of travel of said tape, pulse timer means actuated by the termination of said signal to initiate said feed and rotation, means to impress intelligence on said tape during said feed and rotation, means to play back such intelligence during said feed and rotation, and means to reproduce audibly the playback of such intelligence.

8. The device of claim 7 in which the means to feed said tape comprises a motor, a capstan carrying said tape and driven by said motor, and a spring-retarded relay having an arm carrying an idler wheel adapted to press said tape against said capstan upon energization of said relay.

9. The device of claim 7 in which the means to rotate said head comprises a motor, a spindle carrying said head, a gear train including a clutch member, said gear train coupling said motor and said spindle in driving relation, and a spring-retarded relay having an arm carrying an element of said clutch member, whereby said motor and said spindle are coupled in driving relation upon energization of said relay.

10. The device of claim 9 in which the gear train includes a plurality of gears adapted to impart a non-uniform rate of rotation to said spindle.

11. The device of claim 9 in which the gear train includes a plurality of gears mounted eccentrically whereby said spindle is adapted to rotate at a non-uniform rate.

12. The device of claim 9 in which the gear train includes a plurality of elliptic gears adapted to impart a non-uniform rate of rotation to said spindle.

13. The device of claim 9 in which the gear train includes a plurality of gears adapted to impart oscillatory motion to said spindle.

14. The device of claim 7 in which the means to feed said tape and the means to rotate said head comprises a common motor.

15. The device of claim 7 in which the domed record-playback head comprises a plurality of record coils, a plurality of pick up coils, and a plurality of slip rings, each of said slip rings being connected by a conductor to one of said coils.

16. In a sound recording and reproducing system having a motor, a tape fed by said motor and a head rotated by said motor, the combination comprising first relay means to effect the feeding of said tape, second relay means to effect the rotation of said head, means to lock said head against rotation, a pulse timer, oscillator means to cause said pulse timer to deliver a positive pulse when said oscillator means is de-energized, locking relay means to release said locking means to free said head for rotation, said locking relay means being actuated by said positive pulse, and means to energize said second relay means and said locking relay means simultaneously.

References Cited in the file of this patent

UNITED STATES PATENTS

| | | |
|---|---|---|
| 2,006,961 | Moore | July 2, 1935 |
| 2,396,409 | Berzer | Mar. 12, 1946 |
| 2,496,047 | Goddard | Jan. 13, 1950 |
| 2,618,709 | Eckert | Nov. 18, 1952 |